United States Patent [19]

Nakamura et al.

[11] Patent Number: 5,583,559
[45] Date of Patent: Dec. 10, 1996

[54] LIGHT BEAM OPTICAL SCANNING SYSTEM HAVING AN Fθ MIRROR

[75] Inventors: Hiromu Nakamura; Akiyoshi Hamada, both of Toyokawa, Japan

[73] Assignee: Minolta Camera Kabushiki Kaisha, Osaka, Japan

[21] Appl. No.: 187,341

[22] Filed: Jan. 25, 1994

[30] Foreign Application Priority Data

Jan. 26, 1993 [JP] Japan .................................. 5-010797
Jan. 18, 1994 [JP] Japan .................................. 6-003424

[51] Int. Cl.⁶ ........................................................ B41J 2/47
[52] U.S. Cl. .......................... 347/260; 359/208; 347/241
[58] Field of Search ..................................... 347/259, 260, 347/256, 241, 243; 359/208, 206, 207

[56] References Cited

U.S. PATENT DOCUMENTS 5,038,156  8/1991  Kuroda .

5,212,501  5/1993  Nakamura et al. ..................... 347/259

FOREIGN PATENT DOCUMENTS 57-144518  9/1982  Japan .

Primary Examiner—Mark J. Reinhart
Attorney, Agent, or Firm—Price, Gess & Ubell

[57] ABSTRACT

A laser beam optical scanning system having a laser diode, a collimator lens, a cylindrical lens, a polygonal mirror and an fθ mirror. The fθ mirror has a free toric surface whose curvature in the main scanning direction varies in accordance with field angle. The variation of the curvature of the free toric surface is set in accordance with the position of the fθ mirror in the optical path, and this appropriate setting of the variation of the curvature enables the fθ mirror to correct both distortion and curvature of field in the main scanning direction.

12 Claims, 17 Drawing Sheets

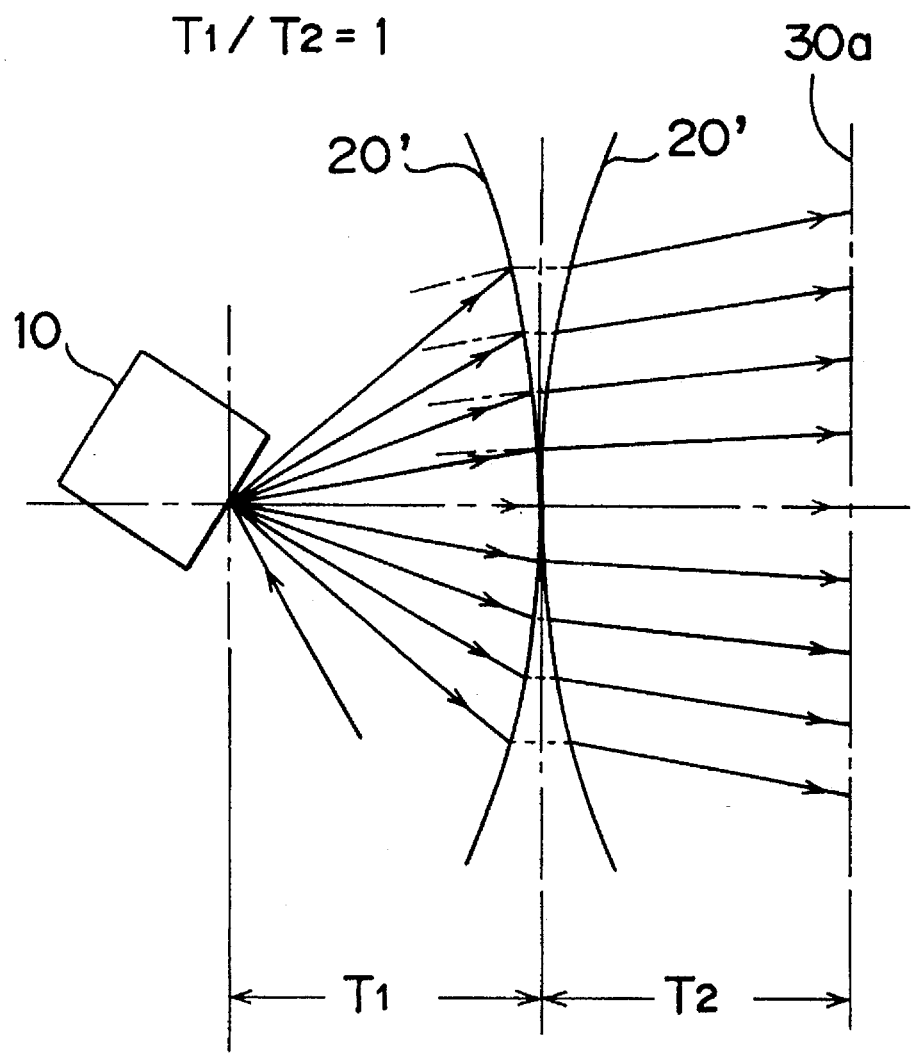

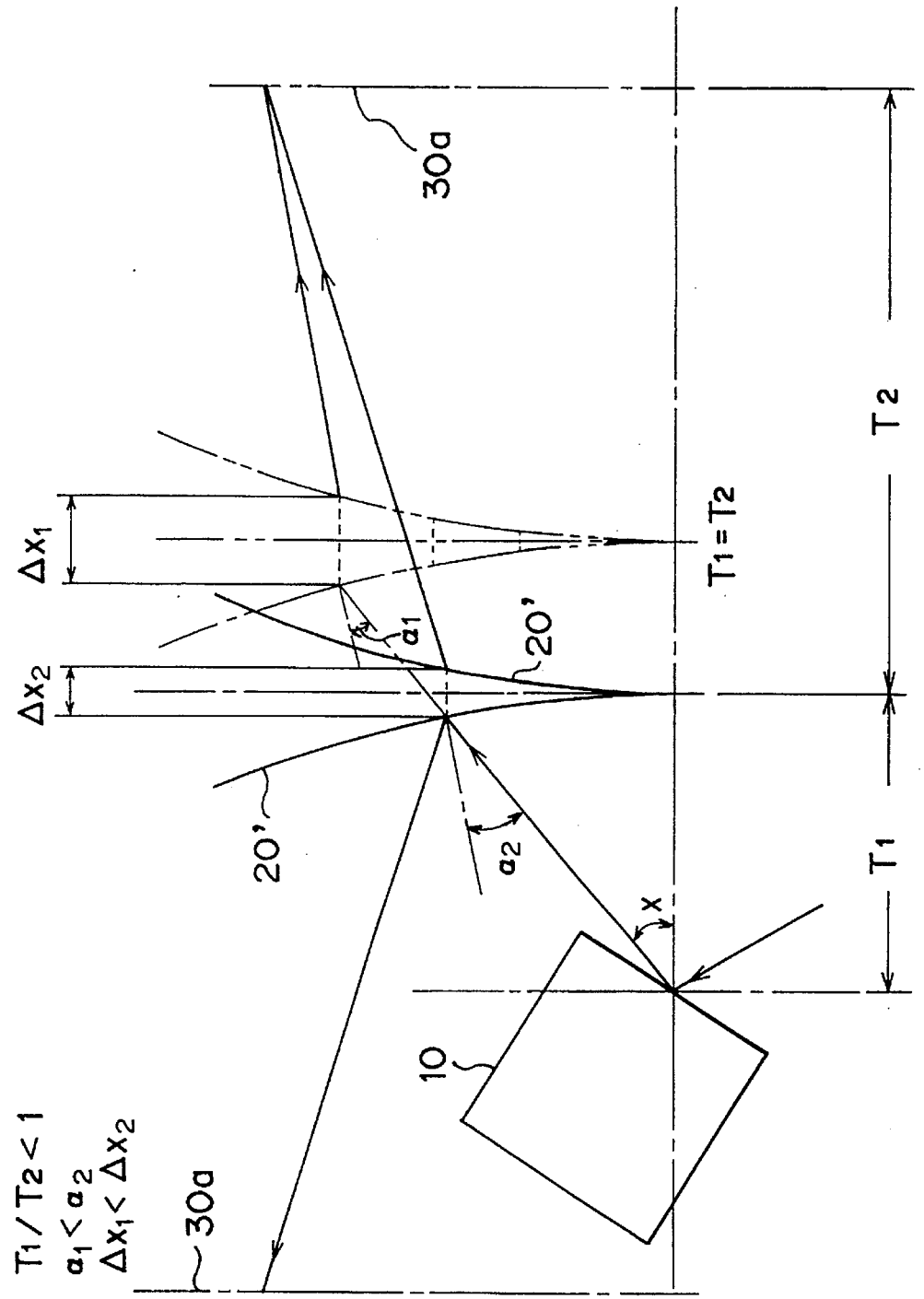

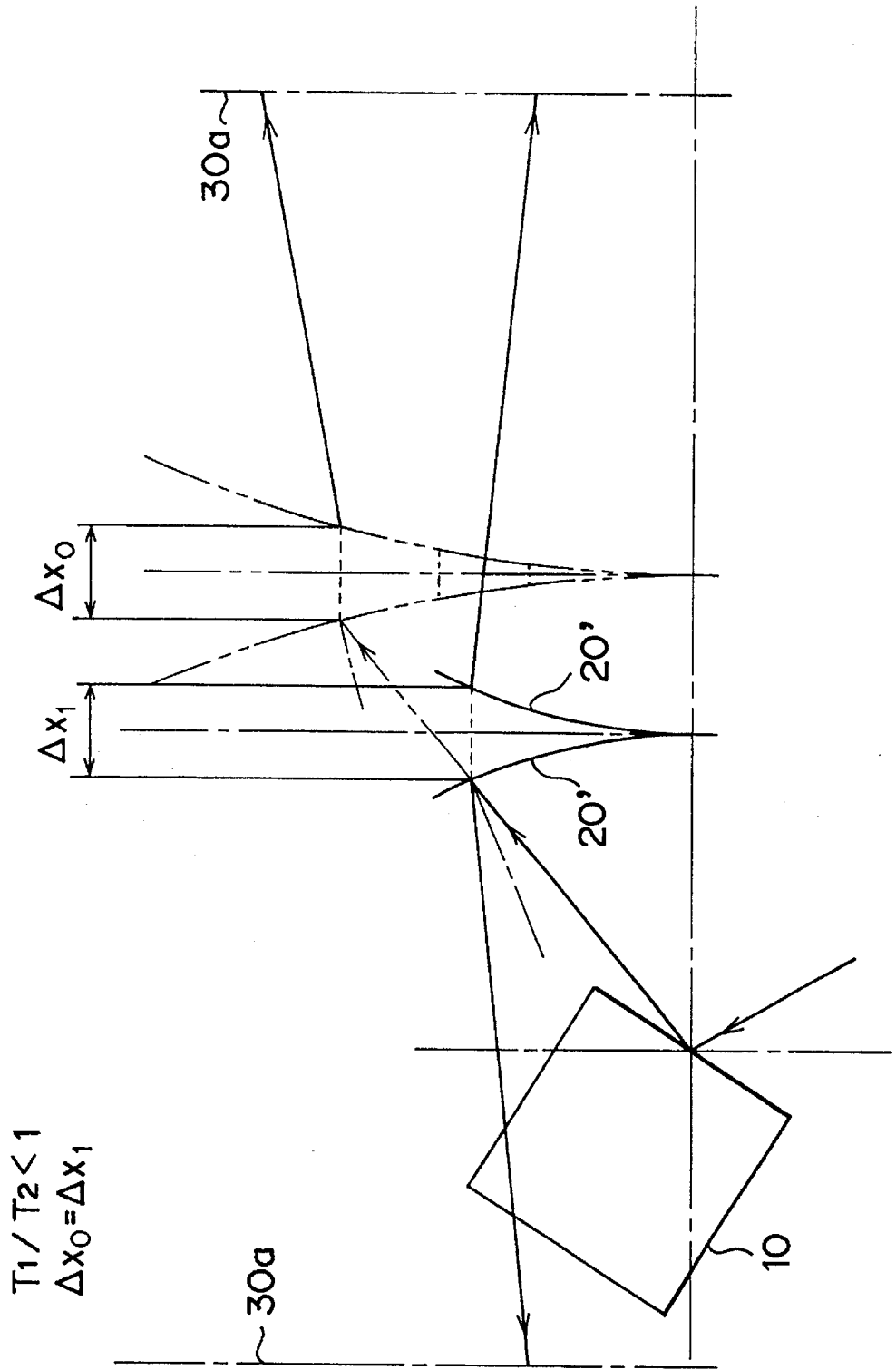

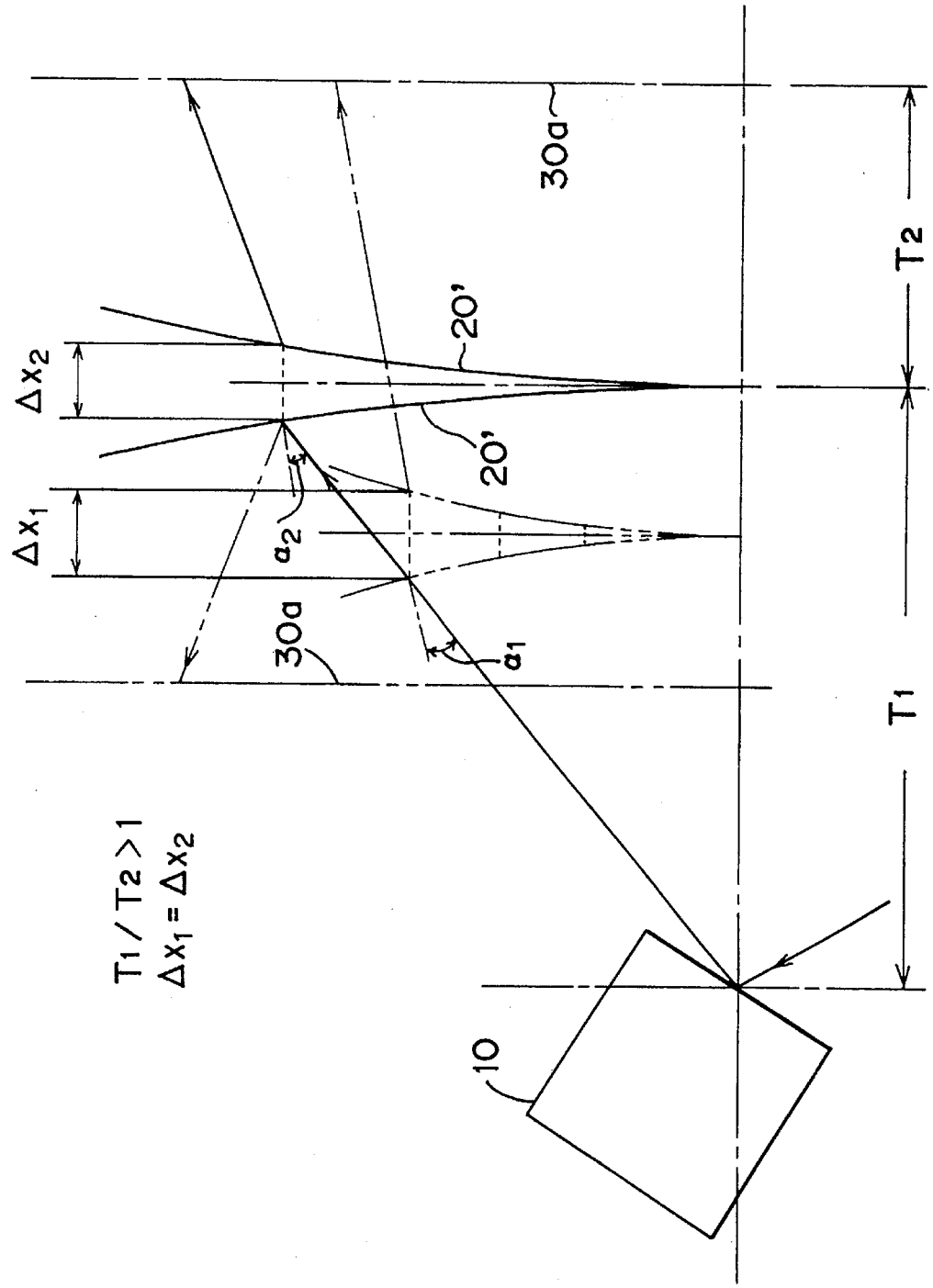

EXAMPLE 1
CURVATURE OF FIELD [mm]

EXAMPLE 1
DISTORTION [%]

EXAMPLE 1
EXPOSURE HEIGHT [mm]

EXAMPLE 3
CURVATURE OF FIELD

EXAMPLE 3
DISTORTION

EXAMPLE 4
CURVATURE OF FIELD

EXAMPLE 4
DISTORTION

EXAMPLE 4
EXPOSURE HEIGHT

FIELD ANGLE : 30°
43 x 41 μm

FIELD ANGLE : 0°
40 x 42 μm

F I G. 15a
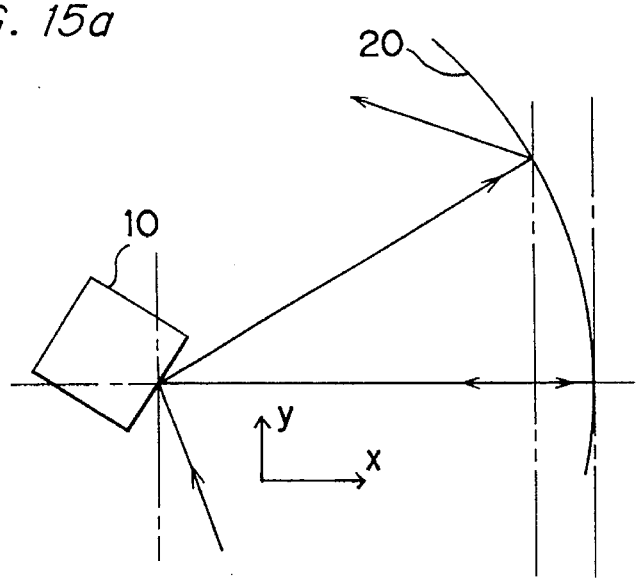
F I G. 15b
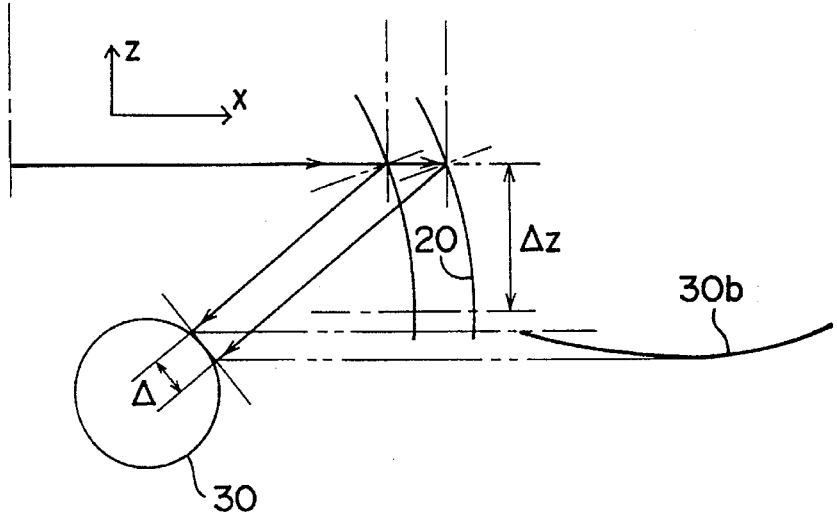

$\Delta z_1 < \Delta z_2$

LIGHT BEAM OPTICAL SCANNING SYSTEM HAVING AN Fθ MIRROR

BACKGROUND OF THE INVENTION

1. Field of the Invention

The present invention relates to a light beam optical scanning system, and more particularly to a light beam optical scanning system to be employed in a laser printer, a facsimile or the like for imaging a light beam which carries image data.

2. Description of Related Art

A light beam optical scanning system employed in a laser printer or a facsimile generally comprises a laser diode, a scanner such as a polygonal mirror and a galvano mirror, and an fθ lens. The scanner deflects a light beam emitted from the laser diode at a constant angular velocity, and with no fθ system, when the light beam is scanned on a light receiving surface, the scanning speed varies between the center portion and the edge portions. The fθ lens is provided in order to adjust the scanning speed, that is, to correct distortion. The fθ lens is composed of various concave lenses and convex lenses. Therefore design of the fθ lens is very complex, and many surfaces must be subjected to polishing, which is not expected to be improved in accuracy. Such an fθ lens is costly. Additionally, the lenses must be made of a material which has a high light transmittance.

Japanese Patent Laid Open Publication No. 1-200219 suggested, in order to downsize the optical system, that a spherical mirror, which can be produced easily with a high accuracy, be used instead of the fθ lens, which is costly and is produced under severe constraint.

Further, as an improvement of this type of optical system which employs a mirror as an fθ system, the applicants suggested that a toroidal mirror be used (refer to Japanese Patent Laid Open Publication No. 4-194814). In the optical system, only one reflective surface of the toroidal mirror functions to correct distortion (as an fθ system), to correct curvature of field in the main scanning direction, to correct curvature of field in the sub scanning direction and to correct an error caused by misalignment of the reflective facets of a polygonal mirror. However, in order to obtain sufficient effect of the fθ mirror in these functions, the fθ mirror must be disposed substantially in the middle of the optical path of the scanning system, that is, the fθ mirror must be disposed such that the distance between the polygonal mirror and the fθ mirror will be substantially equal to the distance between the fθ mirror and the light receiving surface. More specifically, if the ratio of these distances gets out of 1:1, either the function of correcting distortion or the function of correcting curvature of field in the main scanning direction will be weaker. The components of the optical system must be disposed so as to meet the condition, and the components has very little freedom of positioning. Additionally, in connection with the space for the optical system, there may be a case wherein many mirrors have to be provided to make the optical path meet the condition.

SUMMARY OF THE INVENTION

An object of the present invention is to provide a light beam optical scanning system which has sufficient optical characteristics in an easier positioning condition of the components.

In order to attain the object, a light beam optical scanning system has an fθ mirror whose reflective surface is a free toric surface whose curvature in the main scanning direction varies in accordance with field angle, and the fθ mirror reflects a light beam deflected by a scanner and images the beam on a recording medium. The free toric surface means a surface which has mutually different curvatures in the main scanning direction and in the sub scanning direction, at least one of the curvatures varying in accordance with field angle. Additionally, the free toric surface has a principal curve whose curvature varies in accordance with field angle, and the variation of the curvature of the principal curve is called deviation.

In the structure, a light beam emitted from a light unit is deflected by a scanner at a constant angular velocity, and the beam is reflected by the fθ mirror to be imaged on a recording medium. Image formation is carried out by main scanning of the scanner and sub scanning of movement of the recording medium. The beam reflected by the fθ mirror is scanned on the recording medium at a constant scan speed from an end to the other end, that is, the fθ mirror corrects distortion which is caused by difference in the scan speed between the center portion and the end portions. An optical element is disposed before the scanner such that the light beam emitted from the light unit will be imaged on reflective facets of the scanner in a linear form extending in the main scanning direction (in a plane of deflection). Then, when the deflected beam is imaged on the recording medium via the fθ mirror, misalignment of the reflective facets of the scanner does not mar the image because of the optical element and the fθ mirror.

In the light beam optical scanning system according to the present invention, the fθ mirror has a free toric surface, whose principal curve has deviation. The principal curve determines the power of the fθ mirror in the main scanning direction. Because of the deviation, the fθ mirror can correct curvature of field in the main scanning direction without losing its function of correcting distortion. The deviation should be set in accordance with the position of the fθ mirror in the optical path such that the fθ mirror can sufficiently function. A profile curve, which is a section of the reflective surface taken by a plane extending in the sub scanning direction, of the fθ mirror determines the power of the fθ mirror in the sub scanning direction, that is, determines the degree of correction to curvature of field in the sub scanning direction at the field angle.

In the light beam optical scanning system, preferably, the reflective surface has a generator which bends in the sub scanning direction at larger field angles. The generator means a locus of the vertexes of the profile curves. The generator controls exposure positions (beam positions) on the recording medium in the sub scanning direction, and bending of a scan line (line bow) on the recording medium can be prevented.

BRIEF DESCRIPTION OF THE DRAWINGS

This and other objects and features of the present invention will be apparent from the following description with reference to the accompanying drawings, in which:

FIG. 6 is a view of the optical path which is provided with the fθ mirror (spherical mirror) to correct the distortion and the curvature of field in the main scanning direction under condition of $T_1/T_2=1$;

FIG. 7 is a view of the optical path which is provided with the fθ mirror (spherical mirror) to correct the distortion and the curvature of field in the main scanning direction under condition of $T_1/T_2<1$;

FIG. 8 is a view of the optical path which is provided with the fθ mirror (spherical mirror) to correct the distortion and the curvature of field in the main scanning direction under condition of $T_1/T_2<1$ and $\Delta x_o = \Delta x_1$;

FIG. 9 is a view of the optical path which is provided with the fθ mirror (spherical mirror) to correct the distortion and the curvature of field in the main scanning direction under condition of $T_1/T_2>1$;

FIGS. 15a and 15b are views of the fθ mirror, showing its profile curves and a line bow;

DETAILED DESCRIPTION OF THE PREFERRED EMBODIMENTS

Preferred embodiments of the present invention are described referring to the accompanying drawings.

Figure 1:
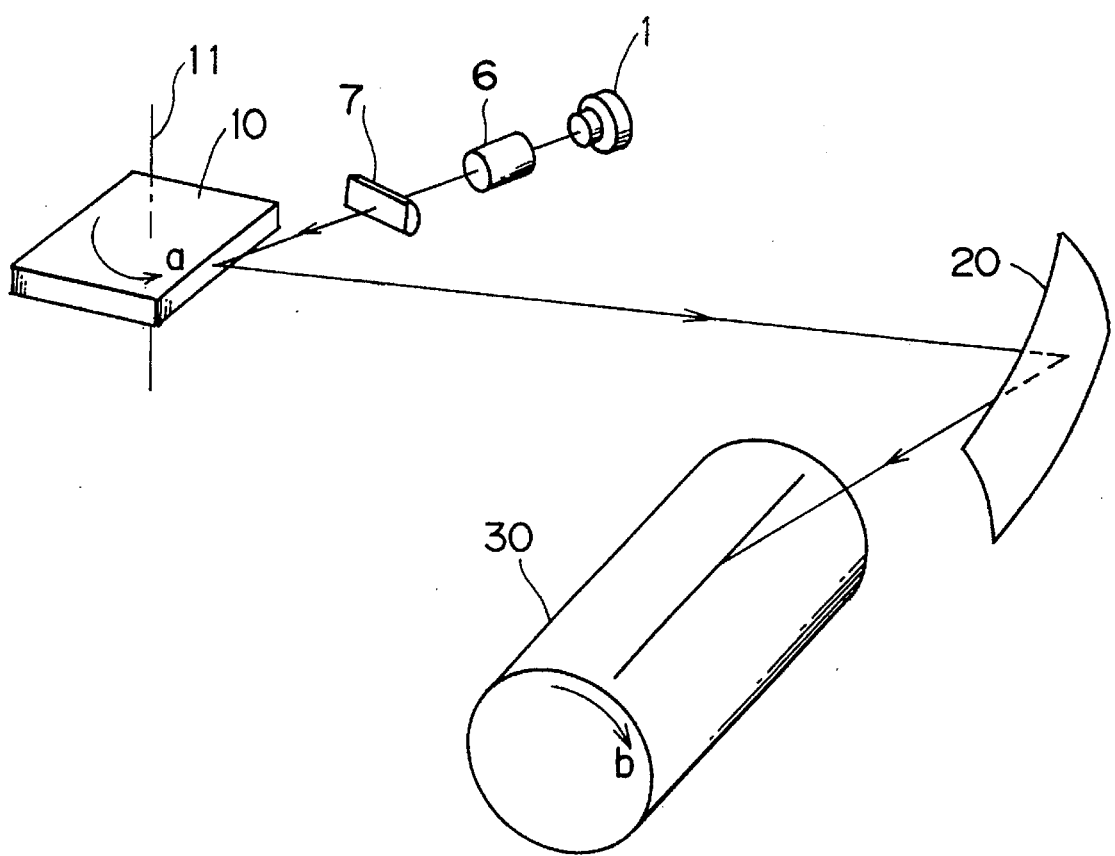
FIG. 1 is a schematic view of a light beam optical scanning system which is a first embodiment of the present invention.
Figure 2:
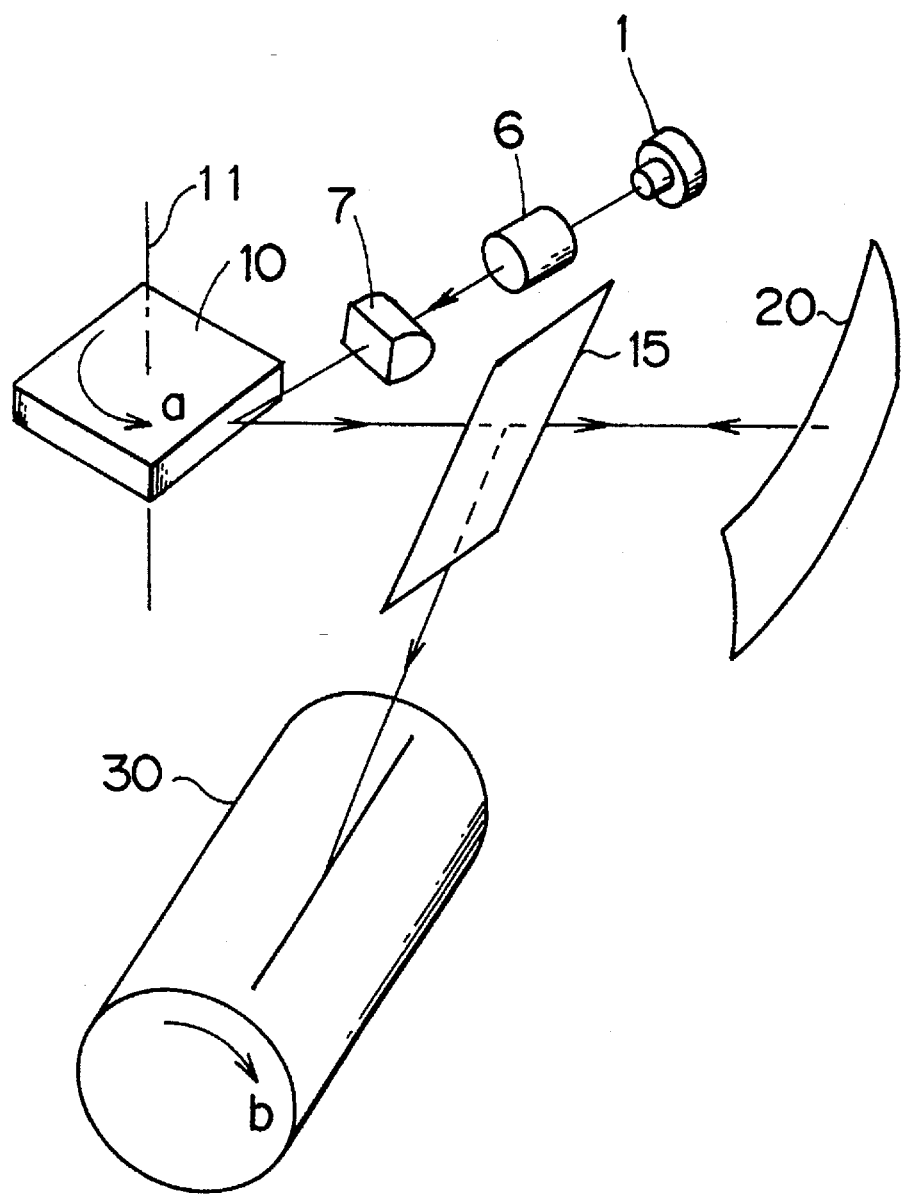
FIG. 2 is a schematic view of a light beam optical scanning system which is a second embodiment of the present invention.

FIG. 1 shows a first embodiment, and FIG. 2 shows a second embodiment. In FIGS. 1 and 2, numeral 1 denotes a laser diode, numeral 6 denotes a collimator lens, numeral 7 denotes a cylindrical lens, numeral 10 denotes a polygonal mirror, numeral 20 denotes an fθ mirror, and numeral 30 denotes a photosensitive drum. In FIG. 2, additionally, numeral 15 denotes a half mirror, which is disposed between the polygonal mirror 10 and the fθ mirror 20. Regarding the composition, the first embodiment and the second embodiment are different from each other in the point whether the half mirror 15 is provided or not.

The laser diode 1 is modulated (turned on and off) by order of a control circuit (not shown) to emit a laser beam carrying image data. The laser beam passes through the collimator lens 6, and thereby the convergence of the laser beam is strengthened. The laser beam further passes through the cylindrical lens 7 and thereby is converged on reflective facets of the polygonal mirror 10 in a linear form. The polygonal mirror 10 is driven by a motor to rotate on a shaft 11 in a direction indicated with arrow a at a constant speed. Accordingly, the laser beam is reflected by the reflective facets of the polygonal mirror 10 serially, that is, is deflected at a constant angular velocity. The deflected beam, in the first embodiment of FIG. 1, is reflected by the fθ mirror 20 and imaged on the photosensitive drum 30. In the second embodiment of FIG. 2, the deflected laser beam passes through the half mirror 15 and reflected by the fθ mirror 20. Then, the laser beam is reflected by the half mirror 15 and imaged on the photosensitive drum 30. The laser beam is scanned along the axis of the photosensitive drum 30, and this is called main scanning. Additionally, the photosensitive drum 30 is driven to rotate in a direction indicated with arrow b at a constant speed, and scanning of the laser beam in accordance with the rotation of the photosensitive drum 30 is called sub scanning. The main scanning and the sub scanning of the laser beam which is emitted from the modulated laser diode 1 result in forming of an electrostatic latent image on the photosensitive drum 30.

The fθ mirror 20 has a free toric surface as its reflective surface. Now the reflective surface of the mirror 20 is described.

Figure 3:
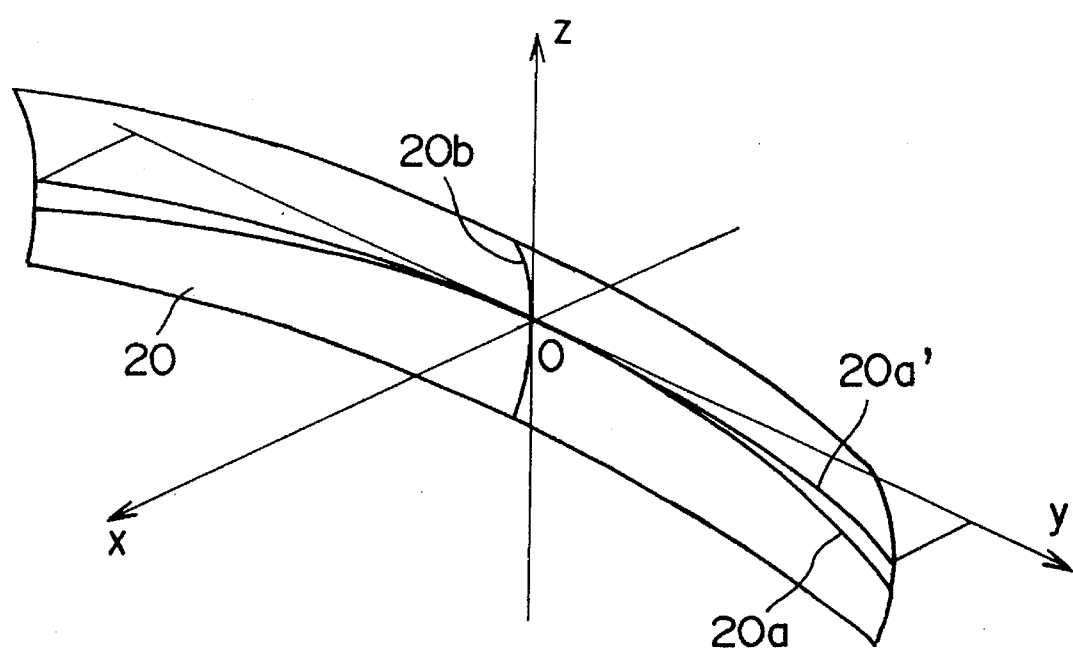
FIG. 3 is a perspective view of a free toric surface.

FIG. 3 shows the free toric surface of the fθ mirror 20. The free toric surface has mutually different curvatures in the main scanning direction (y direction) and in the sub scanning direction (z direction), and the curvature in the main scanning direction varies gradually in accordance with the field angle. A section of the reflective surface taken by a plane extending in the sub scanning direction (a plane in parallel with xz plane) is referred to as a profile curve. A curve 20b shown in FIG. 3 is a profile curve which is the section taken by xz plane. A locus of the vertexes of the profile curves is referred to as a generator (20a). A projected image of the generator 20a on the plane of deflection (xy plane) is referred to as a principal curve (20a').

The power of the free toric surface in the main scanning direction depends on the principal curve 20a'. In other words, the principal curve 20a' controls curvature of field and distortion in the main scanning direction. The power of the free toric surface in the sub scanning direction depends on the profile curves. In other words, the profile curves control curvature of field in the sub scanning direction. The generator 20a controls the exposure positions (beam positions on the photosensitive drum 30) in the sub scanning direction. The curvature of the principal curve 20a' varies in accordance with field angle in the main scanning direction, and the variation of the curvature is referred to as deviation. Effects of the deviation are hereinafter described.

Aberrations Caused by Deflection of the Polygonal Mirror

Figure 4:
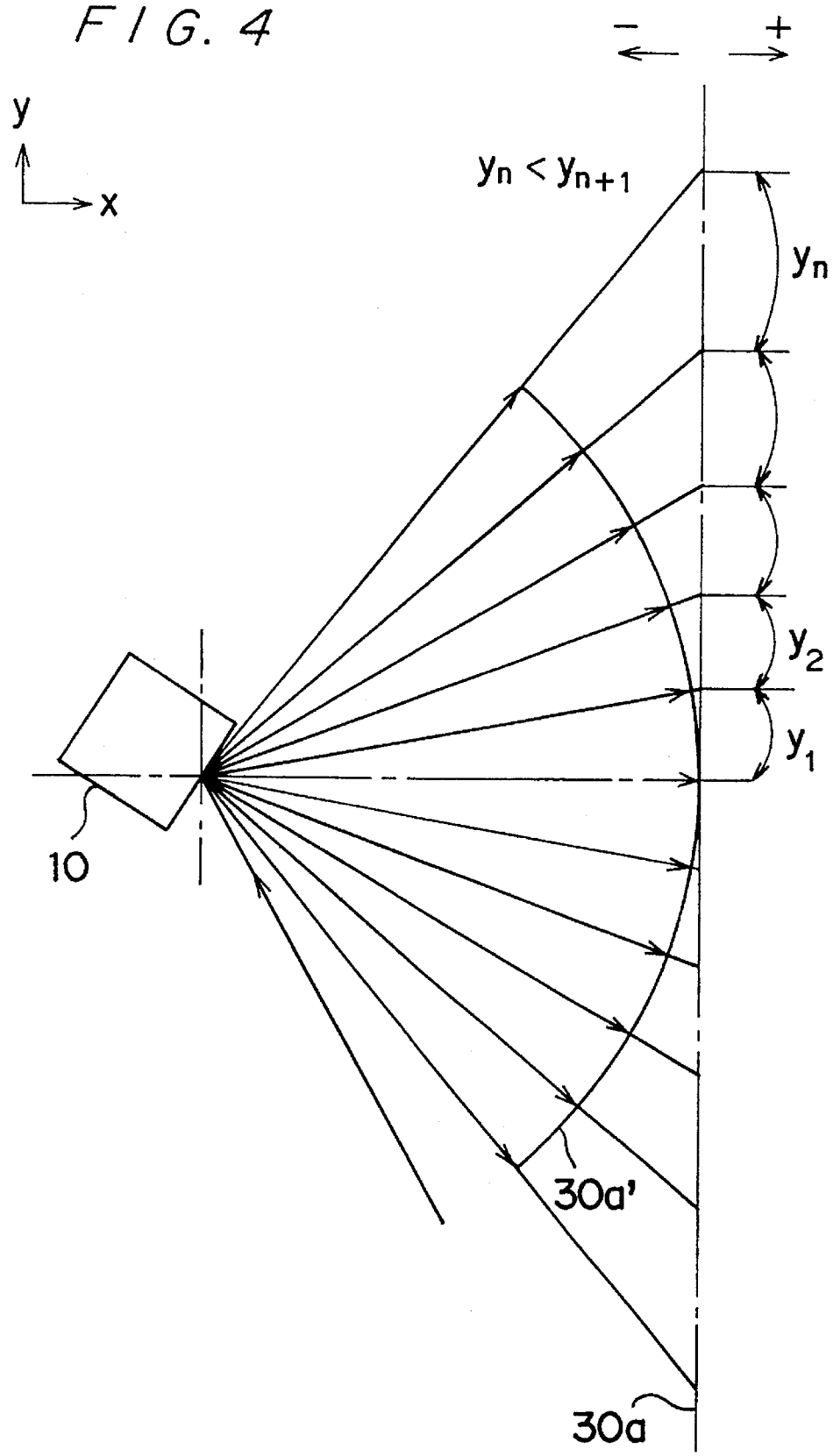
FIG. 4 is a view of an optical path which is not provided with an fθ mirror, showing distortion and curvature of field in the main scanning direction.

FIG. 4 shows curvature of field in the main scanning direction and distortion which will be caused by the operation of the polygonal mirror 10 if the optical system has no fθ system. If the optical system is set such that the laser beam at a field angle of 0 degree will be focused on a light receiving surface 30a, positions of beam waists of the laser beam deflected by the polygonal mirror 10 draw an arc 30a' whose center is the reflection point on the polygonal mirror 10, and in the main scanning direction, curvature of field in a minus direction occurs in places at larger field angles. The laser beam reflected by the polygonal mirror 10 which rotates at a constant velocity is deflected at a constant angular velocity. When the deflected laser beam is received by the light receiving surface 30a, which is a plane, the scanning speed increases in places at larger field angles ($y_n < y_n+1$), that is, distortion in a plus direction occurs.

Action of the fθ Mirror

Figure 5:
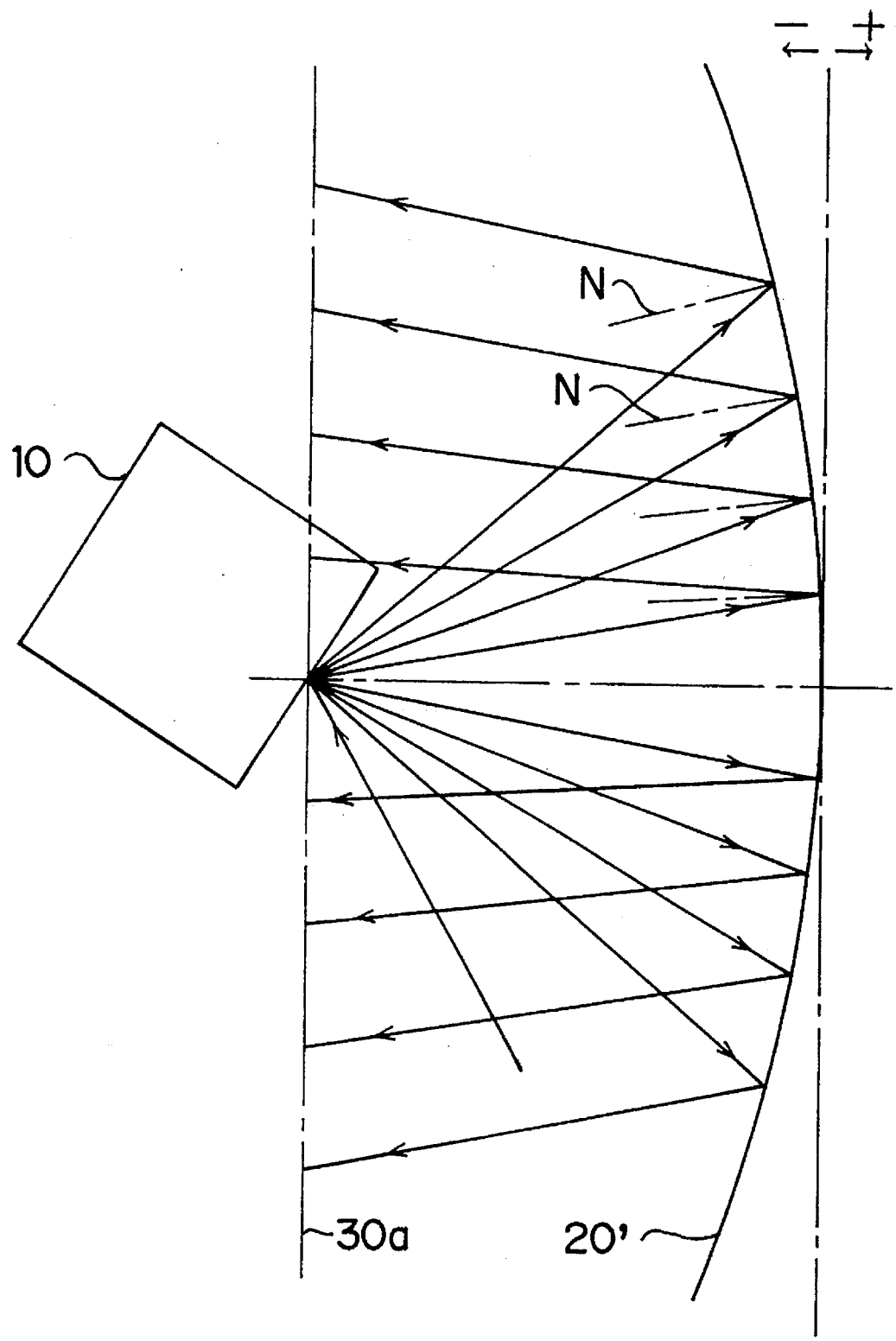
FIG. 5 is a view of an optical path which is provided with an fθ mirror (spherical mirror) to correct the distortion and the curvature of field in the main scanning direction.
Figure 10A:
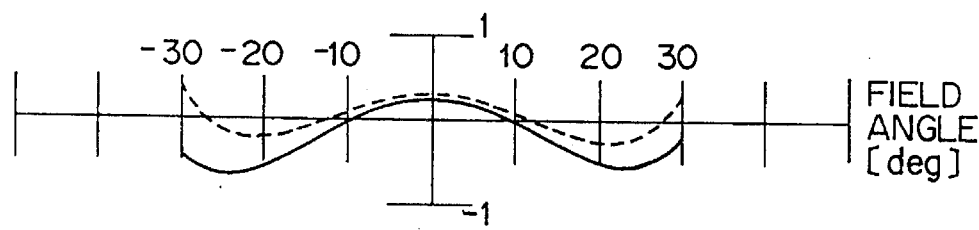
FIGS. 10a, 10b and 10c are charts showing curvature of field, distortion and exposure height on a light receiving surface in Example 1.
Figure 10B:
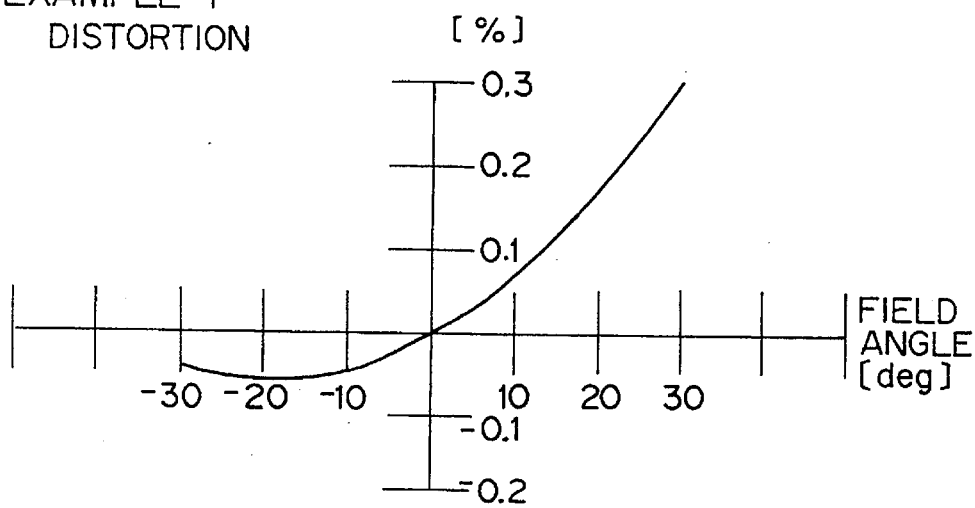
Figure 10C:
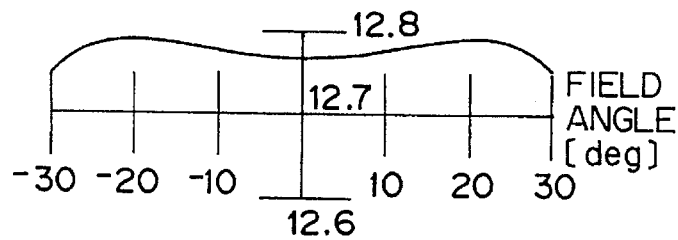
Figure 11A:
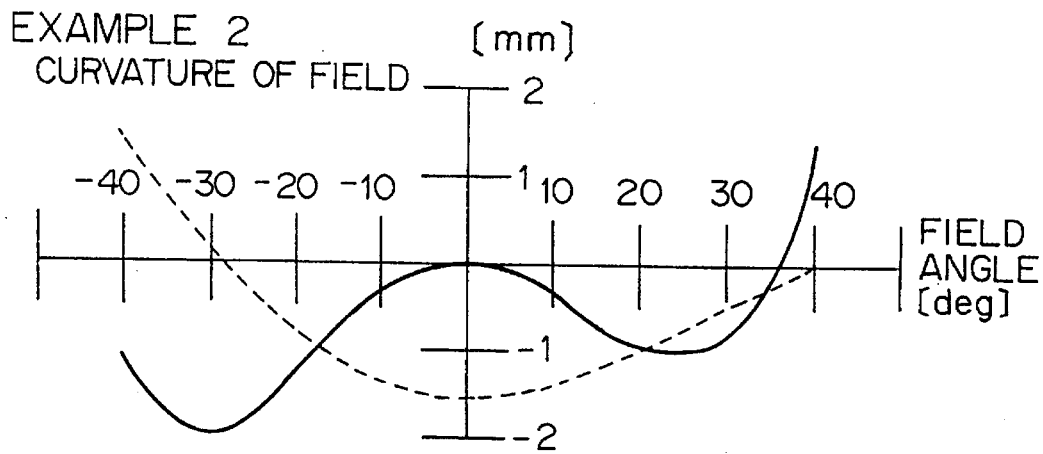
FIGS. 11a, 11b and 11c are charts showing curvature of field, distortion and exposure height on the light receiving surface in Example 2.
Figure 11B:
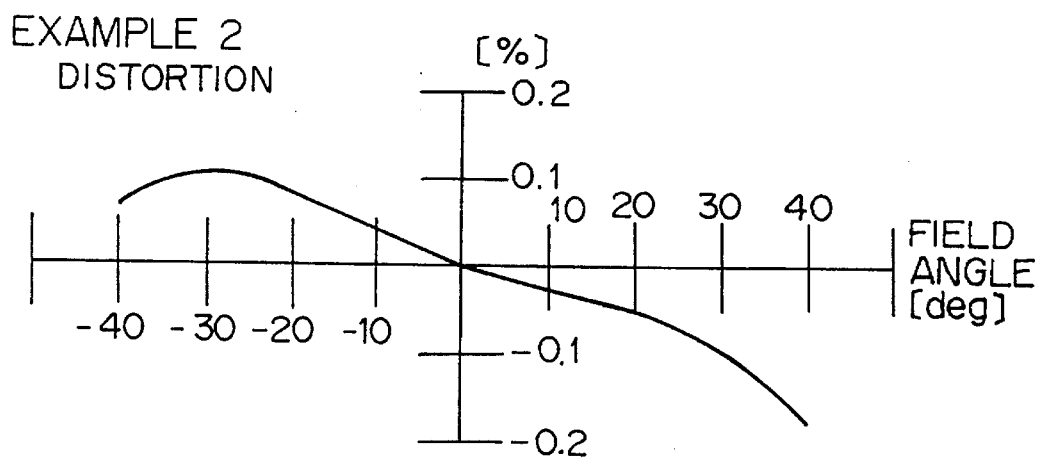
Figure 11C:
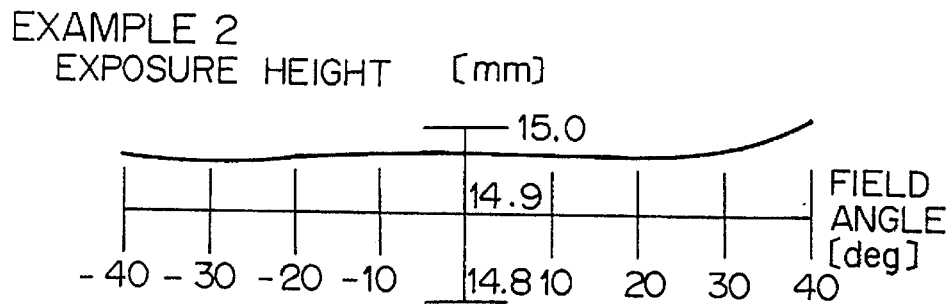
Figure 12A:
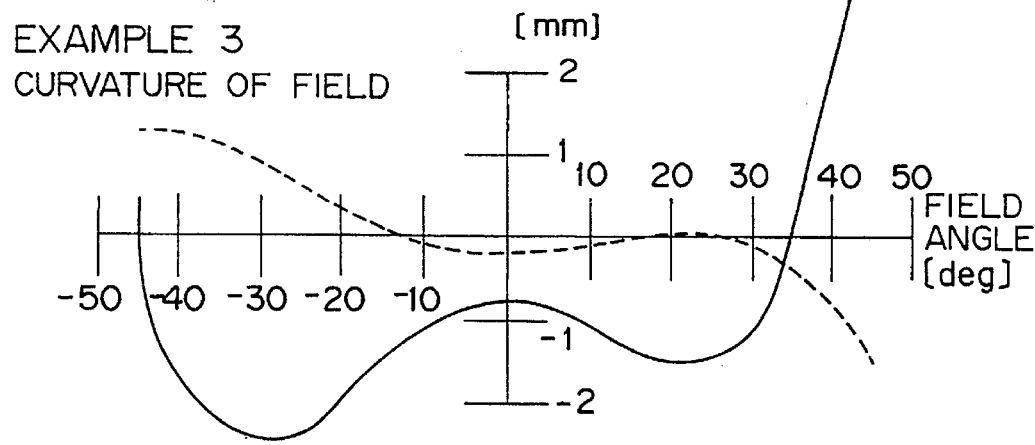
FIGS. 12a and 12b are charts showing curvature of field and distortion on the light receiving surface in Example 3.
Figure 12B:
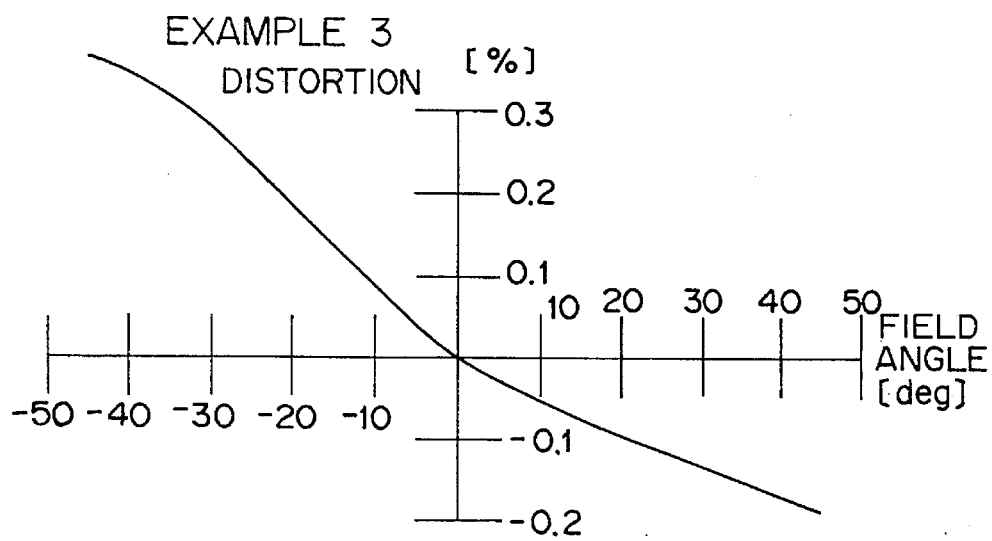
Figure 13A:
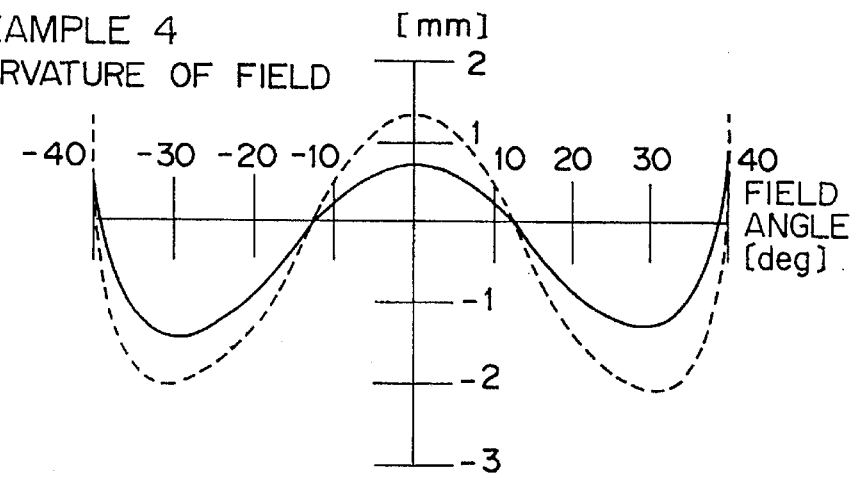
FIGS. 13a, 13b and 13c are charts showing curvature of field, distortion and exposure height on the light receiving surface in Example 4.
Figure 13B:
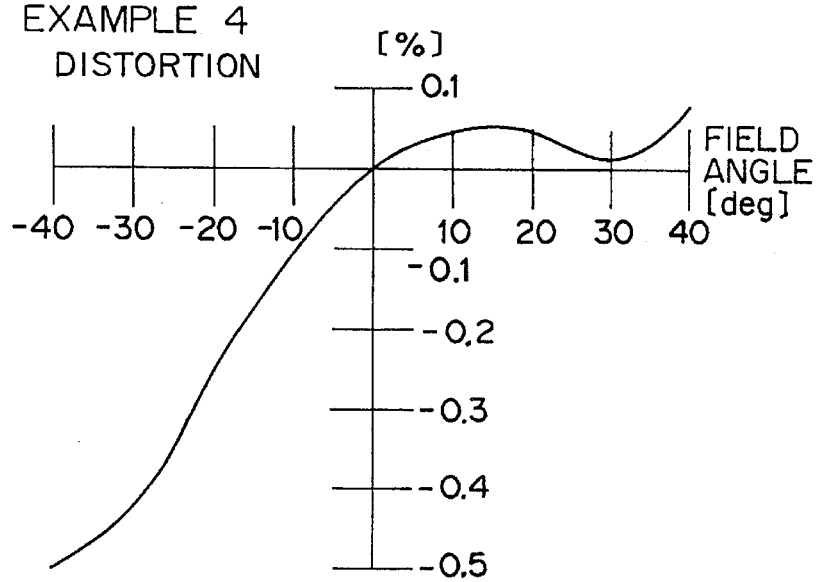
Figure 13C:
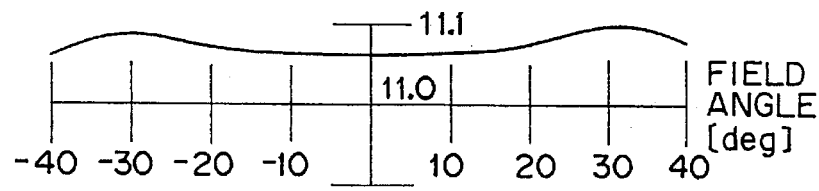

A spherical mirror 20' whose curvature is constant is provided in the optical path as an fθ mirror (see FIG. 5). Normals N on a reflective surface of the spherical mirror 20' slant inward, and larger the field angle is, larger the degree of the inward slanting is. Thereby, the beam waists at larger field angles shift in the plus direction, and the curvature of field shown in FIG. 4 is corrected. Also, in accordance with the curvature of the spherical mirror 20', the optical path length is shortened in places at larger field angles. Thereby, the distortion at larger field angles is corrected.

FIG. 6 shows an optical path provided with the spherical mirror 20'. If the distance $T_1$ between the reflective point on the polygonal mirror 10 and the spherical mirror 20' is nearly equal to the distance $T_2$ between the spherical mirror 20' and the light receiving surface 30a, and if the spherical mirror 20' has a principal curve 20a' whose radius of curvature is three to four times the distance $T_1$, both the field of curvature in the main scanning direction and the distortion can be sufficiently corrected.

In a Case of $T_1/T_2 < 1$

The spherical mirror 20' is moved toward the polygonal mirror 10, and the relation between the distances $T_1$ and $T_2$ changes from $T_1/T_2=1$ to $T_1/T_2<1$ (see FIG. 7). The laser beam in this case reflects the reflective surface of the spherical mirror 20' at a point inside of the point where the laser beam at the same field angle in the case of $T_1/T_2=1$ reflects. Accordingly, in order to obtain the same effect as in the case of $T_1/T_2=1$, as shown in FIG. 8, the curvature of the principal curve 20a' must be increased. As the ratio $T_1/T_2$ is decreasing from 1, the effect of the spherical mirror 20' on the curvature of field in the main scanning direction is becoming weaker than the effect of the mirror 20' on the distortion. In this case, the curvature of field in the main scanning direction is not sufficiently corrected, and the distortion is excessively corrected. If the curvature of the principal curve 20a' is set larger so as to have a relation $\Delta x_o = \Delta x_1$, the curvature of field in the main scanning direction can be corrected appropriately. However, the correction to the distortion is still excessive.

Effect of Deviation

The reflective surface of the spherical mirror 20' is made to be a free toric surface by providing the principal curve 20a' which has a minus radius of curvature with plus deviation. Specifically, the larger the field angle is, the smaller the curvature of the principal curve 20a' is. Thereby, the power of the free toric surface which controls the distortion is weakened at larger field angles. The weakening of the power means the weakening of the converging action on beams, and the beam waists of beams reflected by the mirror 20' at larger angles shift in the plus direction (beam progressing direction). Consequently, the curvature of field in the main scanning direction which occurs in the minus direction is corrected. Thus, the change in the curvature of the spherical mirror 20' makes its function of correcting the curvature of field in the main scanning direction effective, and the deviation prevents the excessive correction to the distortion, which will be caused by the change in the curvature of the spherical mirror 20'. Further, as for the whole surface of the mirror 20', the curvature in the main scanning direction is smaller at larger field angles.

In a Case of $T_1/T_2 > 1$

The spherical mirror 20' is moved toward the light receiving surface 30a, and the relation between the distances $T_1$ and $T_2$ becomes $T_1/T_2>1$ (see FIG. 9). The laser beam in this case reflects the reflective surface of the spherical mirror 20' at a point outside of the point where the laser beam at the same field angle in the case of $T_1/T_2=1$ reflects. Accordingly, in order to obtain the same effect as in the case of $T_1/T_2=1$, the curvature of the principal curve 20a' must be decreased. As the ratio $T_1/T_2$ is increasing from 1, that is, as the distance $T_2$ is becoming shorter, the effect of the spherical mirror 20' on the distortion becomes weaker than the effect of the mirror 20' on the curvature of field in the main scanning direction. In other words, the distortion is not corrected sufficiently, and the curvature of field is corrected excessively.

Effect of Deviation

In order to solve the problem, the reflective surface of the spherical mirror 20' is made to be a free toric surface by providing the principal curve 20a' with minus deviation. Specifically, the larger the field angle is, the larger the curvature of the principal curve 20a' is. Thereby, the power of the free toric surface which controls the distortion is strengthened at larger field angles. The strengthening of the power means the strengthening of the converging action on beams, and the beam waists of beams reflected by the mirror 20' at larger angles shift in the minus direction (in the opposite direction of the beam progressing direction). Consequently, the curvature of field in the main scanning direction which occurs in the plus direction is corrected. Thus, the change in the curvature of the spherical mirror 20' makes its function of correcting the distortion effective, and the deviation prevents the excessive correction to the curvature of field in the main scanning direction, which will be caused by the change in the curvature of the spherical mirror 20'. Further, as for the whole surface of the mirror 20', the curvature in the main scanning direction is larger at larger field angles.

As described above, by using a free toric surface whose generator has deviation as the fθ mirror, even if the optical system does not meet the condition $T_1/T_2 \doteq 1$, it can correct both the distortion and the curvature of field appropriately.

The following describes the free toric surface and experimental examples 1 through 4 referring to specific values. The free toric surface used in the experiments 1 through 4 is expressed by the expression (1). In the expression (1), the configuration of the free toric surface is defined by using a coordinate system (x, y, z). The x axis denotes the direction in which the beam at a field angle of 0 degree progresses, the y axis denotes the main scanning direction, and the z axis denotes the sub scanning direction. A reference point is defined as the origin (0, 0, 0), and points on the free toric surface are defined by coordinates (x, y, z). The configuration of the free toric surface is expressed as an aspherical surface by combining a reference toric surface which is a toric surface including the reference point with aspherical additional coefficients. The aspherical additional coefficients are denoted by $a_{io}$, $a_{jo}$, $a_{ij}$, $a_{oi}$, $a_{oj}$, $\epsilon$, $\epsilon_s$, $S_j$, $\mu$ and $C_s$. In some of the examples, the aspherical surface is wholly shifted (decentered) in the z direction. In the examples, the amount of the shift is denoted by $\Delta z$.

$$x = ky^2/(1 + \sqrt{1 - \mu k^2 y^2}) + \rho + A \qquad (1)$$

-continued $$k = K/(1 - K\rho)$$

$$\rho = C\zeta^{2l}(1 + \sqrt{1 - \epsilon C^2\zeta^2})$$

$$\rho = z - S$$

$$S = C_s y^2/(1 + \sqrt{1 - \epsilon_s C_s^2 y^2}) + \Sigma s_j |y|^j$$

$$A = \Sigma(\Sigma a_{ij}|y|^j)|\zeta|^i$$

$$a_{oo} \equiv 0$$
$$a_{ij} \equiv 0$$
$$a_{ij} \equiv 0$$

μ: quadratic curve parameter of the principal curve (in the main scanning direction)
  μ=1 indicates a circle, μ=0 indicates a parabola, μ<0 indicates a hyperbola, and μ>0 indicates an ellipse.
K: curvature of principal curve at the reference point (in a case of decentering the whole surface as described later, curvature of the principal curve at a place distant from the reference point by the amount of decentration)
ε: quadratic curve parameter of the profile curve (in the sub scanning direction)
  ε=1 indicates a circle, ε=0 indicates a parabola, ε<0 indicates a hyperbola, and ε>0 indicates an ellipse.
C: curvature of the profile curve at the reference point (in a case of decentering the whole surface as described later, curvature of the profile curve at a place from the reference point by the amount of decentration)
$a_{io}$: aspherical coefficient
$a_{oj}$: aspherical coefficient
$a_{ij}$: aspherical coefficient
$\epsilon_s$: quadratic curve parameter of function of torsion in generator
  $\epsilon_s$=1 indicates a circle, $\epsilon_s$=0 indicates a parabola, $\epsilon_s$<0 indicates a hyperbolic, and $\epsilon_s$>0 indicates an ellipse.
$C_s$: curvature of function of torsion in generator
$S_j$: high-order coefficient of function of torsion in generator In the present invention, the free toric surface meets conditions: μ=1, ε=1, $\epsilon_s$=1 and $a_{io}$=0. Accordingly, the expression (1) can be rewritten as follows:

$$x = ky^2/(1 + \sqrt{1 - k^2 y^2}) + \rho + A \quad (2)$$

Further, the experimental examples 1 through 3 meet the following condition:

$$S = c_s y^2/(1 - \sqrt{1 + C_s^2 y^2}) \quad (3)$$

The experimental example 4 meets the following condition:

$$C_s = 0$$

$$S = \Sigma S_j |y|^j = 0.1 \times 10^{-8} |y|^2 + 0.8 \times 10^{-9} |y|^4 \quad (4)$$

Exemplary data about the structure of the optical system are shown in Table 1 as the experimental examples 1 through 4. Concerning the fθ mirrors provided in the experimental examples 1 through 4, their configurations of the reflective surfaces are shown in Table 2 through Table 5.

The experimental examples 1, 2 and 4 are of the type shown in FIG. 1, and the experimental example 3 is of the type shown in FIG. 2.

In the following, a principal curve vertex radius (1/K) means, in a case that the fθ mirror is not decentered, the radius of curvature in the main scanning direction at the reference point, and in a case that the fθ mirror is decentered in the z direction, the radius of curvature in the main scanning direction at a point distant from the reference point by the amount of decentration. A profile curve vertex radius means, in a case that the fθ mirror is not decentered, the radius of curvature of a profile curve at the reference point, and in a case that the fθ mirror is decentered, the radius of curvature of a profile curve at a point distant from the reference point by the amount of the decentration. An object point means a point where a beam is naturally converged. The distances $T_1$ and $T_2$, as already described, indicates the distances between the polygonal scanner and the fθ mirror, and between the fθ mirror and the light receiving surface, and more exactly, the distances from the reference point on the fθ mirror. In Table 2 through Table 5, a vertex shift amount in the x direction and a vertex shift amount in the z direction mean the distance of the vertex from the reference point in the x direction and that in the z direction respectively. An incident angle means the angle of an incident beam to the optical axis (x axis).

TABLE 1

| | Structure of the Optical System | | | |
|---|---|---|---|---|
| | Exam. 1 | Exam. 2 | Exam. 3 | Exam. 4 |
| diameter of inscribed circle of polygonal mirror (mm) | φ 30 | φ 30 | φ 30 | φ 30 |
| f θ mirror | | | | |
| principal curve vertex radius: $R_o$ (mm) (1/K) | −700 | −390 | −330 | −680 |
| aspherical coefficient: $a_{04}$ | −0.3 × $10^{-9}$ | −0.3 × $10^{-8}$ | −0.6 × $10^{-8}$ | −0.11 × $10^{-8}$ |
| profile curve vertex radius: $r_o$ (mm) (1/C) | −188.3 | −160.5 | −142.2 | −145.0 |
| aspherical coefficient: $a_{22}$ | −0.122 × $10^{-7}$ | −0.5 × $10^{-8}$ | −0.5 × $10^{-8}$ | −0.35 × $10^{-7}$ |
| radius of torsion of generator: $CR_o$ (mm) (1/$C_s$) | 19000 | 6700 | — | $S_2$ = 0.1 × $10^{-8}$ $S_4$ = 0.8 × $10^{-9}$ |
| distance between polygonal mirror and object point: S1 (mm) | 514.4 (convergent) | −906.4 (divergent) | −431.75 (divergent) | 393.7 (convergetn) |
| distance between deflection point and f θ mirror: $T_1$ (mm) | 250 | 120 | 100 | 250 |
| distance between f θ mirror and light receiving surface: $T_2$ (mm) | 150 | 240 | 240 | 100 |
| amount of decentration of f θ mirror in z direction: Δz (mm) | 8 | 4 | — | 8 |
| incident angle (degrees) | −55 | −55 | −55 | −55 |
| $T_1/T_2$ | 1.7 | 0.5 | 0.4 | 2.5 |

TABLE 2

Reflective Surface of the f θ mirror of Example 1

| y coordinate of f θ mirror | 30 | 60 | 90 | 120 | 140 |
|---|---|---|---|---|---|
| radius of curvature of principal curve (mm) | −698.42 | −693.80 | −686.51 | −677.14 | −670.10 |
| radius of curvature of profile curve (mm) | −187.35 | −184.57 | −180.09 | −174.16 | −169.54 |
| vertex shift amount in x direction (mm) | −0.64 | −2.58 | −5.83 | −10.42 | −14.26 |
| vertex shift amount in z direction (mm) (torsion of generator) | 0.024 | 0.095 | 0.213 | 0.379 | 0.516 |

TABLE 3

Reflective Surface of the fθ mirror of Example 2

| y coordinate of f θ mirror | 20 | 40 | 60 | 80 | 100 |
|---|---|---|---|---|---|
| radius of curvature of principal curve (mm) | −392.20 | −398.72 | −409.51 | −424.33 | −442.74 |
| radius of curvature of profile curve (mm) | −160.19 | −159.25 | −157.69 | −155.52 | −152.76 |
| vertex shift amount in x direction (mm) | −0.51 | −2.05 | −4.60 | −8.17 | −12.74 |
| vertex shift amount in z direction (mm) (torsion of generator) | 0.030 | 0.119 | 0.269 | 0.478 | 0.746 |

TABLE 4

Reflective Surface of the f θ mirror of Example 3

| y coordinate of f θ mirror | 20 | 40 | 60 | 80 | 100 |
|---|---|---|---|---|---|
| radius of curvature of principal curve (mm) | −333.14 | −342.55 | −358.23 | −379.98 | −407.14 |
| radius of curvature of profile curve (mm) | −141.86 | −140.83 | −139.13 | −136.75 | −133.70 |
| vertex shift amount in x direction (mm) | −0.61 | −2.42 | −5.42 | −9.60 | −14.92 |
| vertex shift amount in z direction (mm) (torsion of generator) | — | — | — | — | — |

TABLE 5

Reflective Surface of the f θ mirror of Example 4

| y coordinate of f θ mirror | 50 | 100 | 120 | 150 | 200 |
|---|---|---|---|---|---|
| radius of curvature of principal curve (mm) | −665.27 | −626.85 | −607.74 | −578.05 | −532.47 |
| radius of curvature of profile curve (mm) | −141.04 | −130.34 | −124.77 | −115.66 | −99.84 |
| vertex shift amount in x direction (mm) | −1.85 | −7.50 | −10.90 | −17.31 | −31.84 |
| vertex shift amount in z direction (mm) (torsion of generator) | 0.005 | 0.08 | 0.17 | 0.41 | 1.28 |

FIGS. 10a, 10b, 10c, 11a, 11b, 11c, 12a, 12b, 13a, 13b and 13c show curvature of field, distortion and exposure height (positions of beam waists in the sub scanning direction) in the respective optical systems of the examples 1 through 4. In FIGS. 10a, 11a, 12a and 13a, solid lines indicate the curvature of field in the main scanning direction, and dashed lines show the curvature of field in the sub scanning direction.

As described above, the distortion and the curvature of field are corrected by making the reflective surface of the fθ mirror 20 to be a free toric surface with deviation. The following describes correction to the other factors of the optical performance.

Correction to an Error Caused by Misalignment of the Reflective Facets

If the reflective facets of the polygonal mirror 10 varies in the perpendicularity, a scanning line in the sub scanning direction on the photosensitive drum 30 will not be straight, and the image will have uneven pitch. The error caused by the misalignment of the reflective facets can be corrected by keeping a conjugate relation between the reflective facets of the polygonal mirror 10 and the light receiving surface of the photosensitive drum 30. In the optical systems of FIGS. 1 and 2, the laser beam is imaged on the polygonal mirror 10 by the cylindrical lens 7, and the reflective facets of the polygonal mirror 10 and the light receiving surface are kept in a conjugate relation by the fθ mirror 20.

Correction to Curvature of Field in the Sub Scanning Direction

When the radius of curvature of the principal curve of the free toric surface of the fθ mirror 20 to a value suitable for correction to the distortion and the curvature of field in the main scanning direction, curvature of field in the sub scanning direction becomes larger in the plus direction at larger field angles. In order to prevent this, the radius of curvature of the toric surface in the sub scanning direction should be set smaller at larger field angles, that is, the curvatures of profile curves at larger angles should be increased.

Torsion of the Generator and Correction to a Line Bow

In order to separate a light incident to the fθ mirror 20 from a light reflected therefrom, as shown in FIGS. 15a and 15b, the fθ mirror 20 should be shifted (decentered) in the z direction (sub scanning direction). However, in respect with the x direction, the reflection point is farther in the minus direction at larger field angles, and consequently, a line bow indicated with a curve 30b (bending of a scanning line) occurs on the light receiving surface of the photosensitive drum 30.

Figure 16A:
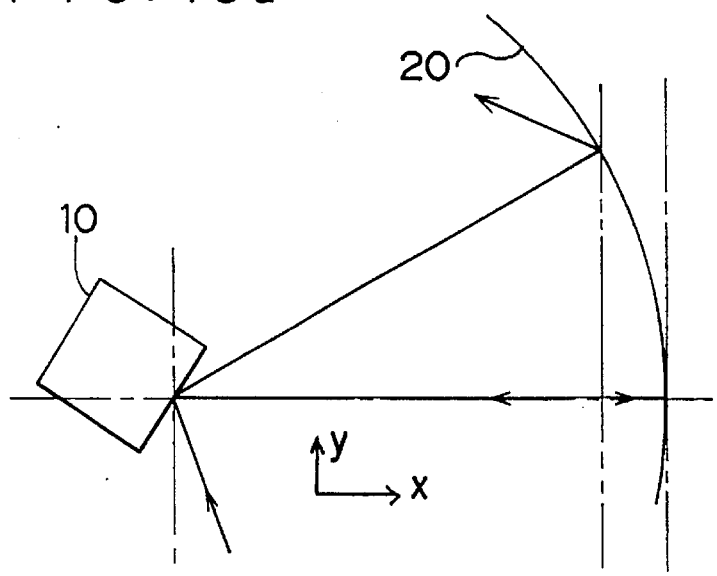
FIGS. 16a and 16b are views of the fθ mirror, showing its profile curves (torsion of its generator) which prevents the occurrence of a line bow.
Figure 16B:
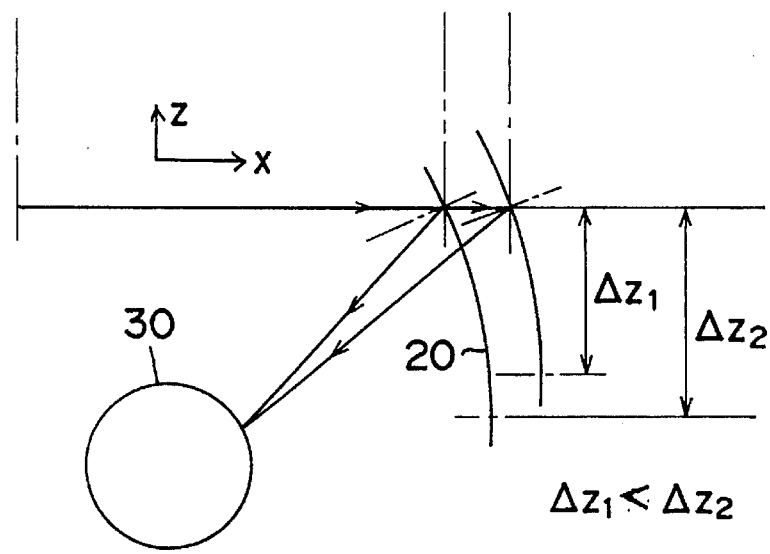

In this case, in order to prevent the occurrence of a line bow, the larger the field angle is, the more in the z direction (sub scanning direction) the vertex of the profile curve should be shifted. As shown in FIGS. 16a and 16b, the shift should be made toward the polygonal mirror 10. Accordingly, the generator bends in the sub scanning direction toward the polygonal mirror 10 more at larger field angles.

Figure 14A:
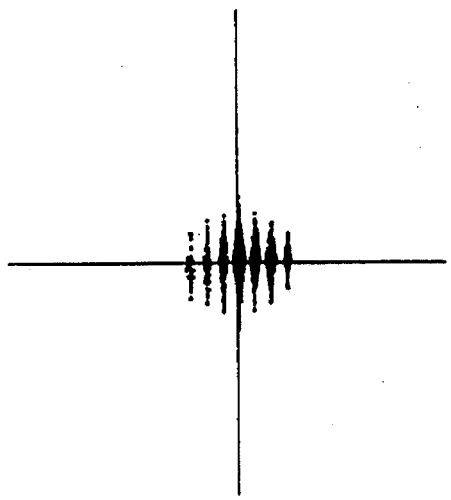
FIGS. 14a and 14b are charts showing beam spots on the light receiving surface in Example 1.
Figure 14B:
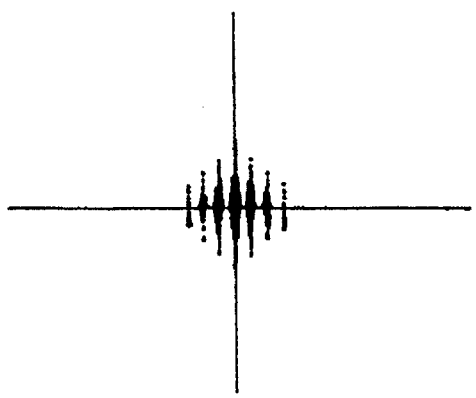

FIGS. 14a and 14b show beam spots at a field angle of 30 degrees and at a field angle of 0 degree which were obtained by simulation in the optical system of Example 1. As can be seen in FIGS. 14a and 14b, even when the beam is stopped to 45×45 μm (half-width), the shape does not change.

In the second embodiment of FIG. 2, the scanning optical path is divided by the half mirror 15. Thereby, in the second embodiment, it is not necessary to provide the generator of the fθ mirror 20 with the bend in the z direction.

Figure 17:
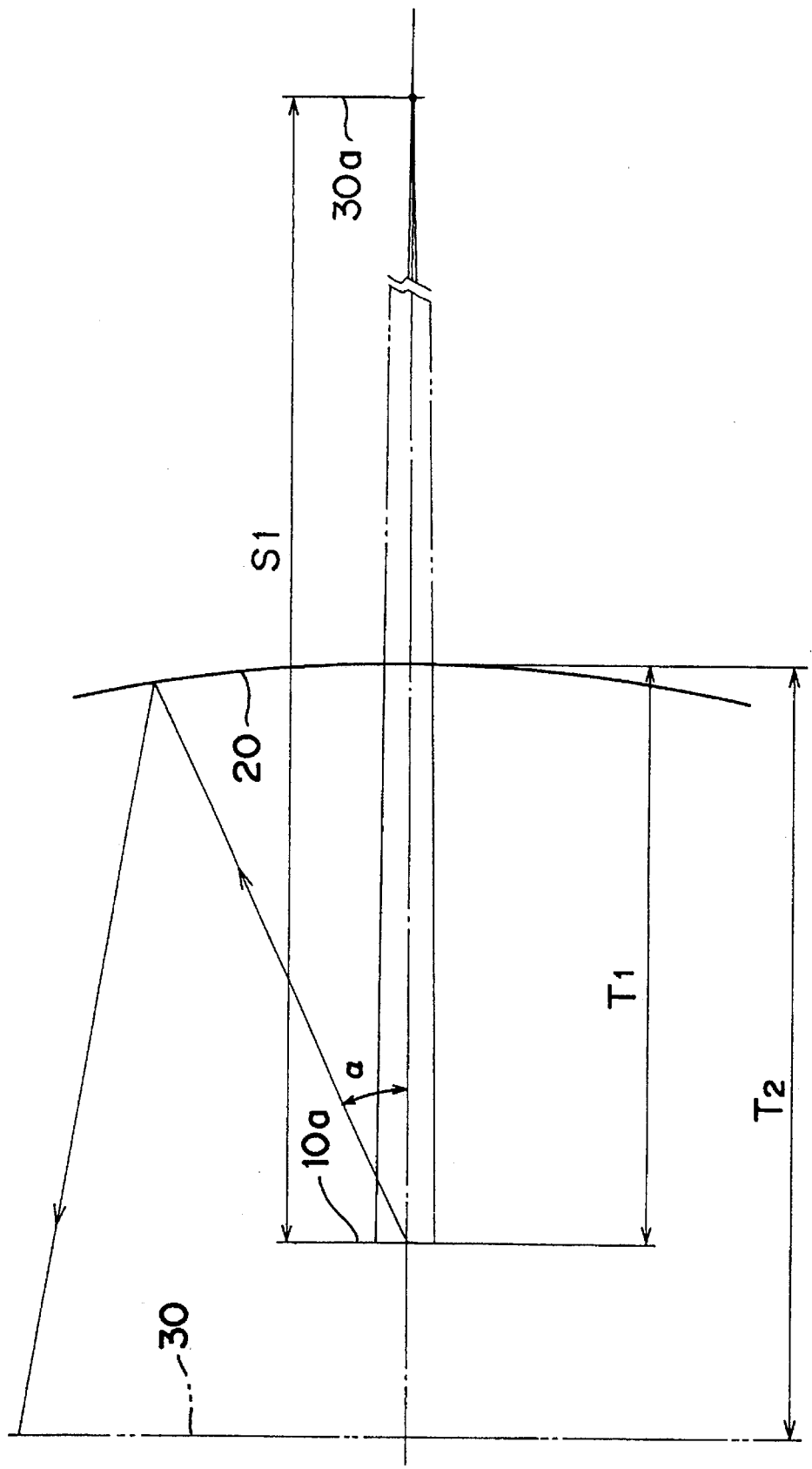
FIG. 17 is a view of the optical path of the light beam optical scanning system.

FIG. 17 shows the distance S1 between the reflective facets 10a of the polygonal scanner 10 and the object point.

In the first and second embodiments, the scanning optical path can be bent in any manner.

Although the present invention has been described in connection with the preferred embodiments above, it is to be noted that various changes and modifications are possible to those who are skilled in the art. Such changes and modifications are to be understood as being within the scope of the invention.

What is claimed is:

1. A light beam optical scanning system comprising:
   a light unit for emitting a light beam modulated in accordance with image data;
   means for converging the light beam emitted from the light unit such that the light beam will have a linear beam spot extending in a main scanning direction;
   a scanner which is disposed in a place where the laser beam is converged by the converging means, for deflecting the light beam at a constant angular velocity; and
   an fθ mirror which has a free toric surface whose curvature in the main scanning direction varies in accordance with field angle, for reflecting the light beam deflected by the scanner and imaging the beam on a recording medium.

2. A light beam optical scanning system as claimed in claim 1, wherein a reflective surface of the fθ mirror has a generator which bends in a sub scanning direction in accordance with field angle.

3. A light beam optical scanning system comprising:
   a laser diode for emitting a light beam modulated in accordance with image data;
   a collimator lens for converging the light beam emitted from the laser diode;
   a cylindrical lens for converging the light beam through the collimator lens such that the light beam will have a linear beam spot extending in a main scanning direction;
   a polygonal mirror which is disposed in a place where the laser beam is converged by the cylindrical lens, for deflecting the light beam at a constant angular velocity; and
   an fθ mirror which has a free toric surface whose curvature in the main scanning direction varies in accordance with field angle, for reflecting the light beam deflected by the scanner and imaging the beam on a recording medium.

4. A light beam optical scanning system as claimed in claim 3, wherein a reflective surface of the fθ mirror has a generator which bends in a sub scanning direction in accordance with field angle.

5. A light beam optical scanning system comprising:
   a light unit for emitting a light beam modulated in accordance with image data;
   means for converging the light beam emitted from the light unit such that the light beam will have a linear beam spot extending in a main scanning direction;
   a scanner which is disposed in a place where the laser beam is converged by the converging means, for deflecting the light beam at a constant angular velocity; and
   an fθ mirror which has a free toric surface with an aspherical curvature in the main scanning direction varying in accordance with the field angle and a different curvature in a sub-scanning direction for reflecting the light beam deflected by the scanner and imaging the beam on a recording medium.

6. The light optical scanning system as claimed in claim 5, wherein the free toric surface has a generator which bends in a sub-scanning direction in accordance with the field angle.

7. The light beam optical scanning system as claimed in claim 6, wherein the curvature in the main scanning direction is larger at larger field angles.

8. The light beam optical scanning system as claimed in claim 7, wherein a ratio of a distance, $T_1$, between a scanner deflecting point and the fθ mirror and a distance, $T_2$, between the fθ mirror and the recording medium can vary between 2.5 and 0.4.

9. A light beam optical scanning system as claimed in claim 5, wherein a ratio of a radius of curvature of a principal curve in the main scanning direction to a radius of curvature of a profile curve in the sub-scanning direction at a full scan position will be approximately 3.9.

10. A light beam optical scanning system as claimed in claim 5, wherein a ratio of a radius of curvature of a principal curve in the main scanning direction to a radius of curvature of a profile curve in the sub-scanning direction at a full scan position will be approximately 2.9.

11. A light beam optical scanning system as claimed in claim 5, wherein a ratio of a radius of curvature of a principal curve in the main scanning direction to a radius of curvature of a profile curve in the sub-scanning direction at a full scan position will be approximately 3.

12. A light beam optical scanning system as claimed in claim 5, wherein a ratio of a radius of curvature of a principal curve in the main scanning direction to a radius of curvature of a profile curve in the sub-scanning direction at a full scan position will be approximately 5.3.

* * * * *